United States Patent
Nanavati et al.

(10) Patent No.: US 11,144,552 B2
(45) Date of Patent: Oct. 12, 2021

(54) SUPPORTING JOINS IN DIRECTED ACYCLIC GRAPH KNOWLEDGE BASES

(71) Applicant: INTERNATIONAL BUSINESS MACHINES CORPORATION, Armonk, NY (US)

(72) Inventors: Amit Anil Nanavati, New Delhi (IN); Birgit Monika Pfitzmann, Zürich (CH); Anil Maddipatla, Hyderabad (IN); Narendra Kumar Agrawal, Nawapara Chhal (IN)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 172 days.

(21) Appl. No.: 16/502,802

(22) Filed: Jul. 3, 2019

(65) Prior Publication Data
US 2021/0004372 A1    Jan. 7, 2021

(51) Int. Cl.
*G06F 16/24*    (2019.01)
*G06F 16/2455*    (2019.01)
*G06N 20/00*    (2019.01)
*G06F 16/248*    (2019.01)
*G06F 16/28*    (2019.01)

(52) U.S. Cl.
CPC ........ *G06F 16/2456* (2019.01); *G06F 16/248* (2019.01); *G06F 16/282* (2019.01); *G06N 20/00* (2019.01)

(58) Field of Classification Search
CPC .................................................. G06F 16/2456
USPC ........................................................ 707/737
See application file for complete search history.

(56) References Cited

U.S. PATENT DOCUMENTS

| | | | |
|---|---|---|---|
| 7,451,144 B1* | 11/2008 | Koudas | G06F 16/83 |
| 2009/0030921 A1* | 1/2009 | Kadiyska | G06F 40/14 |
| 2011/0066626 A1* | 3/2011 | Dharmalingam | G06F 40/174 |
| | | | 707/758 |
| 2015/0006505 A1* | 1/2015 | Plakhov | G06F 16/24578 |
| | | | 707/710 |

(Continued)

FOREIGN PATENT DOCUMENTS

KR    10-1772333    8/2017

OTHER PUBLICATIONS

NoSQL Database Aggregation, 8 pages, [online at the internet: https://restdb.io/docs/nosqi-database-aggregation]. [Last visited Jun. 25, 2019].

(Continued)

*Primary Examiner* — Syling Yen
(74) *Attorney, Agent, or Firm* — F. Chau & Associates, LLC

(57) ABSTRACT

A method, apparatus, and non-transitory computer readable medium for performing joins on data from hierarchical databases are described. The method, apparatus, and non-transitory computer readable medium may provide for receiving one or more search results from each of a plurality of hierarchical databases, identifying one or more matching fields from each of the search results, joining the search results according to a set of rules for processing related fields to the matching fields, wherein the related fields comprise sibling fields, neighbor fields, ancestor fields, descendant fields, or any combination thereof, and generating one or more combined search results based on the joining.

15 Claims, 6 Drawing Sheets

(56) References Cited

U.S. PATENT DOCUMENTS

2017/0109407 A1\* 4/2017 Ayyagari ................ G06F 16/93
2018/0004804 A1 1/2018 Merriman et al.
2019/0377825 A1\* 12/2019 Chang ................... G06F 40/247

OTHER PUBLICATIONS

How-to-perform-aggregation-over-data-stored-in-NoSQL, 4 pages, [online at the Internet: https://github.com/Impetus/Kundera/wiki/How-to-performaggregation-over-data-stored-in-NoSQL%3F]. [Last visited Jun. 25, 2019].

Single Purpose Aggregation Operations, 5 pages, [online at the Internet: https://docs.mongodb.com/manual/aggregation/#single-purpose-aggregation-operations]. [Last visited Jun. 25, 2019].

\* cited by examiner

SUPPORTING JOINS IN DIRECTED ACYCLIC GRAPH KNOWLEDGE BASES

BACKGROUND

The following relates generally to performing data joins, and more specifically to performing joins on data from hierarchical databases.

Various database technologies are used to organize digital information. Well defined relational algebras exist for performing operations on tables in a relational database. However, operations such as joining may not be well defined for other types of databases such as hierarchical databases (e.g., a database which stores and retrieves information in the JavaScript object notation (JSON) format). Thus, when searches are made on different hierarchical databases, it may be difficult or confusing to visualize the aggregated results.

SUMMARY

A method, apparatus, and non-transitory computer readable medium for performing joins on data from hierarchical databases are described. The method, apparatus, and non-transitory computer readable medium may provide for receiving one or more search results from each of a plurality of hierarchical databases, identifying one or more matching fields from each of the search results, joining the search results according to a set of rules for processing related fields to the matching fields, wherein the related fields comprise sibling fields, neighbor fields, ancestor fields, descendant fields, or any combination thereof, and generating one or more combined search results based on the joining.

DETAILED DESCRIPTION

Figure 1:
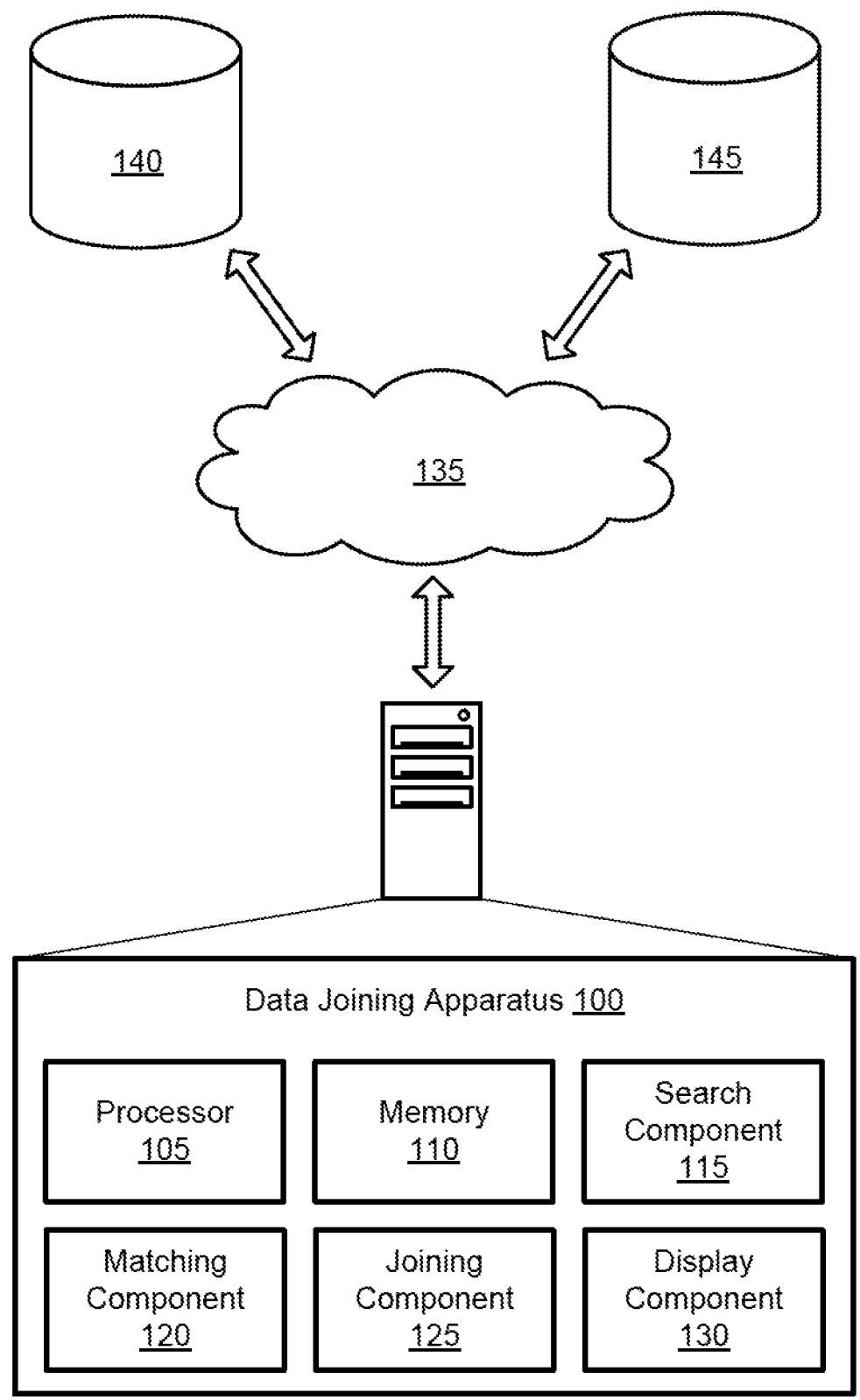
FIG. 1 shows an example of a data joining apparatus in accordance with aspects of the present disclosure.

Embodiments of the present disclosure provide systems and methods of aggregating and displaying hierarchical data objects (e.g., from hierarchical databases) in a uniform way. For example, a user may make a query to multiple databases. Each result may include a reference field and one or more ancestors, descendants, sibling, and neighbors based on the nature of the query. The present disclosure describes systems and methods for combining these search results in a coherent way based on the interrelationships among the databases. Furthermore, the disclosure provides for inferring these interrelationships and depicting them in a meaningful way.

According to the present disclosure, an aggregate is a collection of data that the system interacts with as a unit. These units of data or aggregates form the boundaries for Atomicity, Consistency, Isolation, and Durability (ACID) operations with the database. Key-value, Document, and Column-family databases can all be considered as forms of aggregate-oriented databases. Thus, examples of the present disclosure relate to hierarchical databases and Document databases. Aggregate-oriented databases provide special challenges for inter-aggregate relationships compared to intra-aggregate relationships.

An aggregate element in a hierarchical database, e.g., with data in the JavaScript object notation (JSON) format, may be either an object (i.e., a hierarchical structure) or an array (a list structure). Fields within an object may contain a name (or key) and a value, which may be a string, a number, or another object or array. Fields may have siblings, descendants, ancestors, and neighbors. A sibling of a reference field is in the same object, and at the same hierarchical level. A descendent is at a lower hierarchical level, nested within the reference field. An ancestor is at a higher level, and contains the reference field. And a neighbor is at the same level as the reference field, but located within a different object (i.e., within two different elements of an array).

In a taxonomy merging operation, each vertex may be a keyword. Complex objects may include arrays and structures, and among taxonomies, only keywords may match. In hierarchical results, the attributes (i.e., field names) and values can match, which matters in the merge. Thus, when both an attribute of a field and at least one of a field's values match, the disjoint fields constitute the union.

In a first example of an aggregation method (i.e., the Flat Merge method), search results are combined by creating a search result object and setting top-level fields as sibling fields of the search result object. In some examples, if multiple results are returned from the same database, multiple search result objects may be created corresponding to different combinations of the results from each database. In some cases, different combinations may become elements of an array.

In a second example of an aggregation method (i.e., the Primary Merge method), matching fields are merged, as are matching ancestors. Ancestors of the primary matching field (if present) become common ancestors, but other ancestors are discarded.

In relational databases, there are no hierarchies, but the present disclosure provides for handling hierarchies and multiple databases. Therefore cycles may occur and should be considered. In fact, when working with taxonomies, avoiding cycles may be a primary concern. Furthermore, in relational databases, there are no aggregates, but the present disclosure provides for handling objects such as arrays, structures, etc.

Thus, embodiments of the present disclosure provides systems and methods that avoid cycles. Furthermore, methods for rendering and visualization of the matched or unmatched fields are described. Thus, systems and methods are described to visualize the result of a query across multiple hierarchical databases in a manner such that common fields are identified, interrelationships (e.g., sibling, and ancestor-descendent relationships) are logically consistent and visualized appropriately, and in a general, logically consistent manner.

FIG. 1 shows an example of a data joining apparatus 100 in accordance with aspects of the present disclosure. Data joining apparatus 100 may include processor 105, memory 110, search component 115, matching component 120, joining component 125, and display component 130. In an example embodiment, data joining apparatus 100 may communicate with a first database 140 and second database 145 via network 135. However, in other examples there may be a different number of databases, and the databases may be connected to the data joining apparatus 100 in a manner that doesn't require communicating through the network 135.

A processor 105 may include an intelligent hardware device, (e.g., a general-purpose processing component, a digital signal processor 105 (DSP), a central processing unit (CPU), a graphics processing unit (CPU), a microcontroller, an application specific integrated circuit (ASIC), a field programmable gate array (FPGA), a programmable logic device, a discrete gate or transistor logic component, a discrete hardware component, or any combination thereof). In some cases, the processor 105 may be configured to operate a memory 110 array using a memory 110 controller. In other cases, a memory 110 controller may be integrated into processor 105. The processor 105 may be configured to execute computer-readable instructions stored in a memory 110 to perform various functions.

A computer memory 110 may store information for various programs and applications on a computing device. For example, the storage may include data for running an operating system. The memory 110 may include both volatile memory and non-volatile memory. Volatile memory may include random access memory 110 (RAM), and non-volatile memory 110 may include read-only memory (ROM), flash memory, electrically erasable programmable read-only memory (EEPROM), digital tape, a hard disk drive (HDD), and a solid state drive (SSD). Memory 110 may include any combination of readable and/or writable volatile memories and/or non-volatile memories, along with other possible storage devices.

Search component 115 may receive one or more search results from each of a set of hierarchical databases. Search component 115 may also identify a query for each of the hierarchical databases. Search component 115 may also transmit the corresponding query to each of the hierarchical databases, where the search results from each of the hierarchical databases are received in response to the query. In some examples, the query for each of the hierarchical databases includes a same query.

Matching component 120 may identify one or more matching fields from each of the search results. Matching component 120 may also identify a field name synonym list including one or more field name equivalence classes. Matching component 120 may also determine that a field name of the one or more matching fields from each of the search results includes an equivalent field name based on the field name synonym list. Matching component 120 may also generate the field name synonym list based on at least one of the hierarchical databases using a machine learning model. In some examples, the one or more fields from each of the search results includes a common value.

Joining component 125 may join the search results according to a set of rules for processing related fields to the matching fields, where the related fields include sibling fields, neighbor fields, ancestor fields, descendant fields, or any combination thereof. Joining component 125 may also generate one or more combined search results based on the joining, Joining component 125 may also identify one or more top level fields from each of the search results. Joining component 125 may also set the top level fields as sibling fields. Joining component 125 may also select a primary search result and a secondary search result from the search results. Joining component 125 may also merge matching fields of the primary search result and the secondary search result. Joining component 125 may also set siblings of the matching fields of the secondary search result as siblings of the corresponding, matching fields of the primary search result. Joining component 125 may also discard unmatched ancestor fields of the secondary search result.

Joining component 125 may also select a subsequent search result from the search results. Joining component 125 may also join the subsequent search result into a combined search result of all previously merged search results according to the set of rules for processing related fields until each of the search results has been joined, in some examples, the combined search results include a set of distinct combined search results corresponding to a set of distinct search results from at least one of the hierarchical databases combined with one or more other search results from another of the hierarchical databases.

In some examples, the set of rules for processing related fields specifies that if two arrays each have a matching element then sibling fields of the matching elements become sibling fields of each other. In some examples, the set of rules for processing related fields specifies that children fields of matching elements become sibling fields of each other. In some examples, the set of rules for processing related fields specifies that if a primary search result includes an array having an element with a first field, and a secondary search result includes a non-array object with a second a field matching the first field, then sibling fields of the second field become siblings of the first field. In some examples, the set of rules for processing related fields specifies that if a primary search result includes a non-array object with a first field, and a secondary search result includes an array having an element with a second field matching the first field, the second field matching the first field is discarded.

Display component 130 may display the combined search results to a user in response to a query. In some examples, the combined search results are displayed using different colors for data coming from different hierarchical databases. Display component 130 may also display a set of field names for each of the matching fields together as a combined field name.

Figure 2:
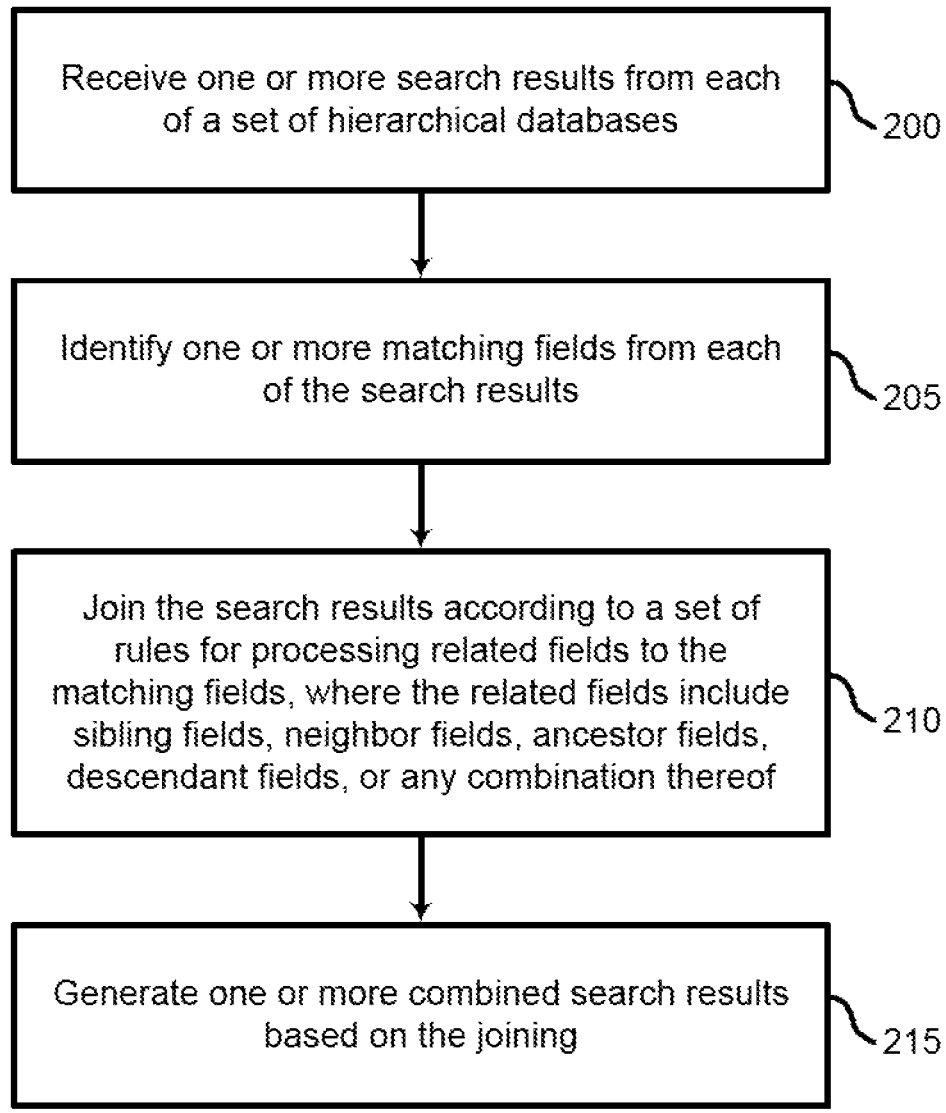
FIG. 2 shows an example of a process for performing joins on data from hierarchical databases in accordance with aspects of the present disclosure.

FIG. 2 shows an example of a process for performing joins on data from hierarchical databases in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 200, the system receives one or more search results from each of a set of hierarchical databases. In some cases, the operations of this step may refer to, or be performed by, a search component as described with reference to FIG. 1. In some examples, obtaining the search results includes identifying a query for each of the hierarchical databases and transmitting the corresponding query to each of the hierarchical databases, wherein the search results from each of the hierarchical databases are received in response to the query.

At step 205, the system identifies one or more matching fields from each of the search results. In some cases, the operations of this step may refer to, or be performed by, a matching component as described with reference to FIG. 1.

In some examples, matching the fields includes identifying a field name synonym list comprising a one or more field name equivalence classes; and determine that a field name of the one or more matching fields from each of the search results comprises an equivalent field name based on the field name synonym list.

At step 210, the system joins the search results according to a set of rules for processing related fields to the matching fields, where the related fields include sibling fields, neighbor fields, ancestor fields, descendant fields, or any combination thereof. In some cases, the operations of this step may refer to, or be performed by, a joining component as described with reference to FIG. 1.

In one example (i.e., in a Flat Merge), joining the search results includes identifying one or more top level fields from each of the search results; and setting the top level fields as sibling fields.

In another example (i.e., in a Primary Merge), joining the search results includes selecting a primary search result and a secondary search result from the search results; merging matching fields of the primary search result and the secondary search result; setting siblings of the matching fields of the secondary search result as siblings of the corresponding matching fields of the primary search result; and discarding unmatched ancestor fields of the secondary search result.

At step 215, the system generates one or more combined search results based on the joining. In some cases, the operations of this step may refer to, or be performed by, a joining component as described with reference to FIG. 1.

Figure 3:
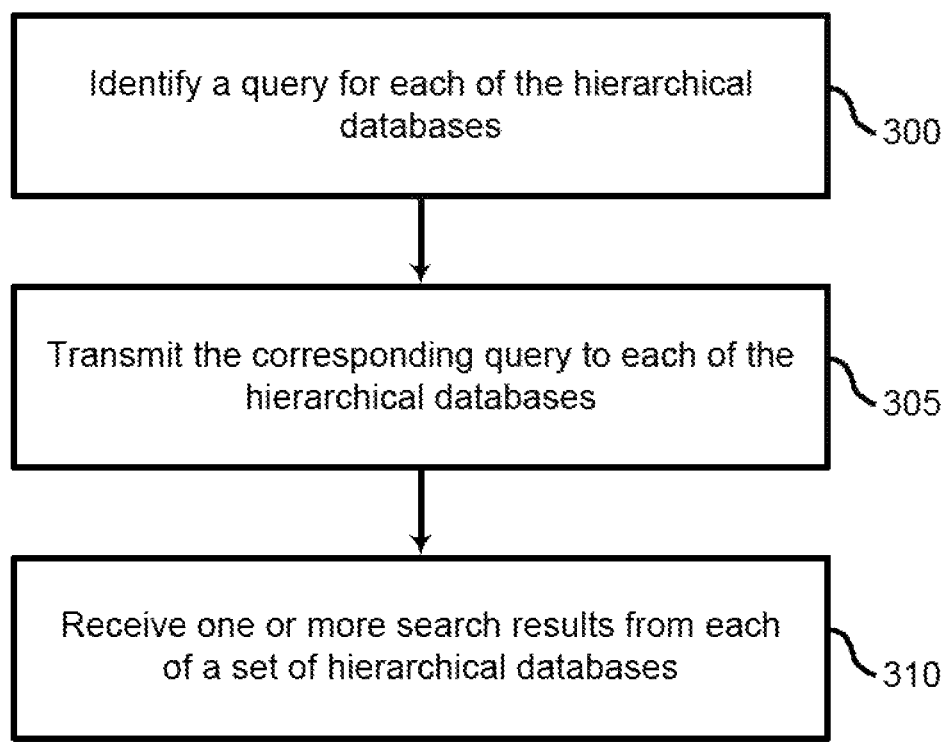
FIG. 3 shows an example of a process for performing a search on multiple databases in accordance with aspects of the present disclosure.

FIG. 3 shows an example of a process for performing a search on multiple databases in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At step 300, the system identifies a query for each of the hierarchical databases. In some cases, the operations of this step may refer to, or be performed by, a search component as described with reference to FIG. 1.

At step 305, the system transmits the corresponding query to each of the hierarchical databases. In some cases, the operations of this step may refer to, or be performed by, a search component as described with reference to FIG. 1.

At step 310, the system receives one or more search results from each of a set of hierarchical databases. In some cases, the operations of this step may refer to, or be performed by, a search component as described with reference to FIG. 1.

According to one example, the search results from a first database may be in a form similar to the following (based on a search for "[attribute]=ABCD-101" returning two results that are combined as elements of a top level array):

```
[
    {
        "service": "Service Desk",
        "serviceL1": "Service Desk",
        "baselineName": "Service Desk Supported Users",
        "offerings": [{
```

-continued

```
            "offeringId": "ABCD-101",
        }]
    },
    {
        "service": "Service Desk",
        "serviceL1": "Service Desk",
        "baselineName": "Percent Non-English calls",
        "offerings": [{
            "offeringId": "ABCD-101",
            "optimizable": true,
            "costBaselines": {
                "US": {"process": "SO:US:Mobility Service
                    Service Desk"}
            }
        }]
    }
]
```

Similarly, search results from a second database using the same query may appear as the following (returning a single result as an element of a top level array):

```
[
    {
        "offering_hierarchies": [{
            "fin_div": "00",
            "id": "ABCD-101",
            "level30_desc": "(O) Workplace Support Services",
            "level30_id": "ABCD-101",
            "level40_desc": "(O) for service desk",
            "level40_id": "LMNO-555",
        }],
        "customer_triggers": {
            "triggers": [
                {"trigger": "a) Includes service desk agents;"},
                {"trigger": "b) Provides phone support for IT
                    problems;"}
            ],
        }
    }
]
```

Figure 4:
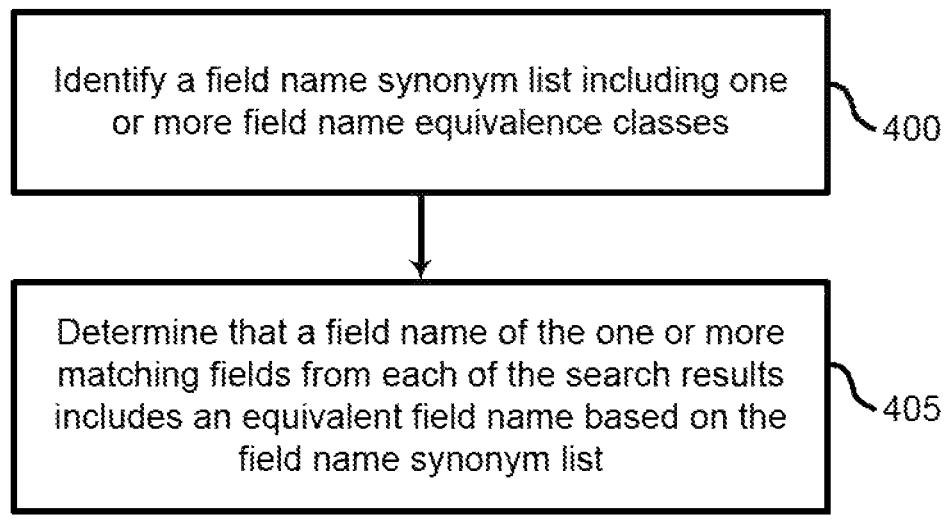
FIG. 4 shows an example of a process for matching fields from search results in accordance with aspects of the present disclosure.

FIG. 4 shows an example of a process for matching fields from search results in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various sub-steps, or may be performed in conjunction with other operations described herein.

At step 400, the system identifies a field name synonym list including one or more field name equivalence classes. In some cases, the operations of this step may refer to, or be performed by, a matching component as described with reference to FIG. 1.

At step 405, the system determines that a field name of the one or more matching fields from each of the search results includes an equivalent field name based on the field name synonym list. In some cases, the operations of this step may refer to, or be performed by, a matching component as described with reference to FIG. 1.

In some examples the synonym list (i.e., the taxonomy) may be somewhat loose in that synonyms within an equivalence class need not be of the same data type. For example, an array field may be made equivalent to an object, such that the object is understood to be equivalent to an element of the array.

Figure 5:
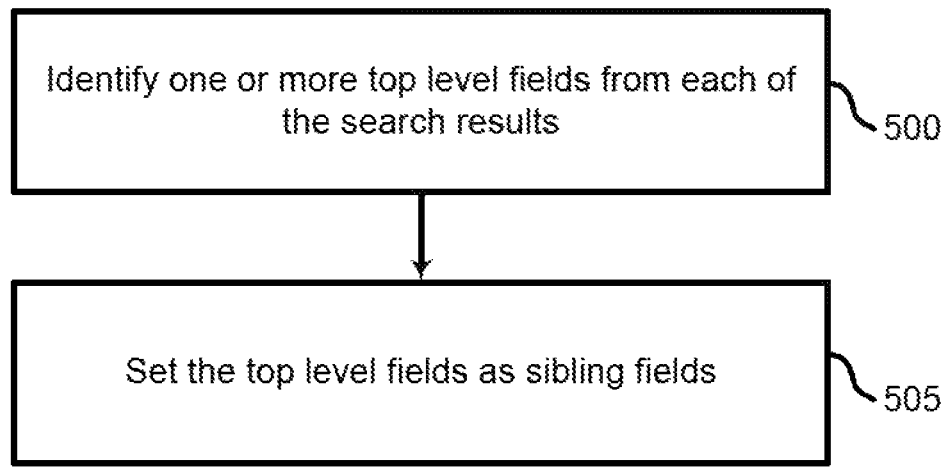
FIG. 5 shows an example of a process for performing a flat merge in accordance with aspects of the present disclosure.

FIG. 5 shows an example of a process for performing a flat merge in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 500, the system identifies one or more top level fields from each of the search results. In some cases, the operations of this step may refer to, or be performed by, a joining component as described with reference to FIG. 1.

At step 505, the system sets the top level fields as sibling fields. In some cases, the operations of this step may refer to, or be performed by, a joining component as described with reference to FIG. 1.

Thus, according to an example embodiment, an attribute-map is given a priori. For example, the following may refer to the same entity: "offeringId" in a first database="level30_id" in a second database; or "offerings[ ]" in the first database="offering_hierarchies [ ]" in the second database as described above. Then, consider the search term "[attribute]=ABCD-101", with a query specifying that a set of related fields are also retrieved if a match is found. Then the term is searched (in parallel, or in series), and results are returned in an array of zero or more elements (each corresponding to a distinct match).

In the Flat Merge, the results from each individual query are merged together such that the top-most elements in the hierarchy of each result become siblings. The Flat Merge method extends in a similar way to results from more than hierarchical databases. That is, all top-level ancestors are set at the same level (i.e., as elements of a top level array):

```
[
    {
        "offering_hierarchies": [{
            "fin_div": "00",
            "id": "ABCD-101",
            "level30_desc": "(O) Workplace Support Services",
            "level30_id": "ABCD-101",
            "level40_desc": "(O) for service desk",
            "level40_id": "LMNO-555",
        }],
        "customer_triggers": {
            "triggers": [
                {"trigger": "a) Includes service desk agents;"},
                {"trigger": "b) Provides phone support for IT
                    problems;"}
            ],
        },
        "service": "Service Desk",
        "serviceL1": "Service Desk",
        "baselineName": "Service Desk Supported Users",
        "offerings": [{
            "offeringId": "ABCD-101",
        }]
    },
    {
        "offering_hierarchies": [{
            "fin_div": "00",
            "id": "ABCD-101",
            "level30_desc": "(O) Workplace Support Services",
            "level30_id": "ABCD-101",
            "level40_desc": "(O) for service desk",
            "level40_id": "LMNO-555",
        }],
        "customer_triggers": {
            "triggers": [
                {"trigger": "a) Includes service desk agents;"},
                {"trigger": "b) Provides phone support for IT
                    problems;"}
            ],
        },
        "service": "Service Desk",
        "serviceL1": "Service Desk",
        "baselineName": "Percent Non-English calls",
        "offerings": [{
            "offeringId": "ABCD-101",
            "optimizable": true,
            "costBaselines": {
                "US": {"process": "SO:US:Mobility Service
                    Service Desk",}
            }
        }]
    }
]
```

Figure 6:
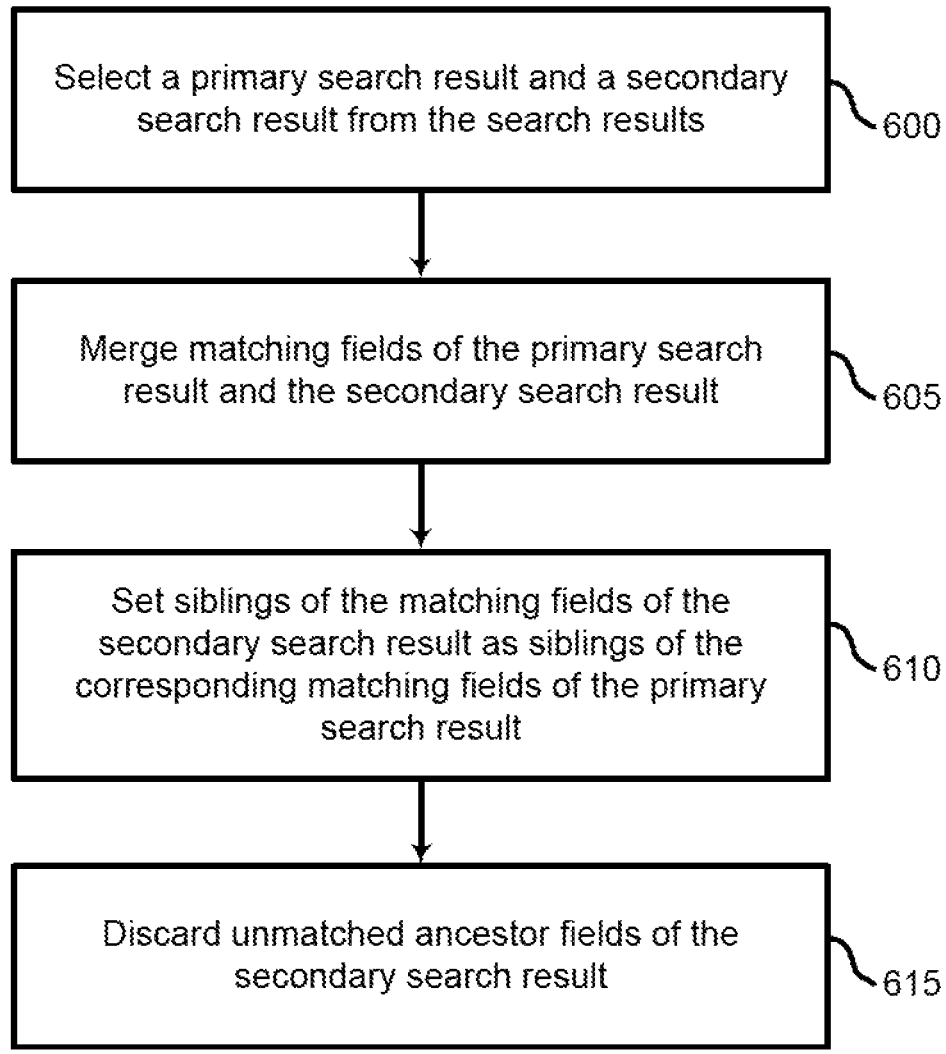
FIG. 6 shows an example of a process for performing a primary merge in accordance with aspects of the present disclosure.

FIG. 6 shows an example of a process for performing a primary merge in accordance with aspects of the present disclosure. In some examples, these operations may be performed by a processor executing a set of codes to control functional elements of an apparatus. Additionally or alternatively, the processes may be performed using special-purpose hardware. Generally, these operations may be performed according to the methods and processes described in accordance with aspects of the present disclosure. For example, the operations may be composed of various substeps, or may be performed in conjunction with other operations described herein.

At step 600, the system selects a primary search result and a secondary search result from the search results. In some cases, the operations of this step may refer to, or be performed by, a joining component as described with reference to FIG. 1.

At step 605, the system merges matching fields of the primary search result and the secondary search result. In some cases, the operations of this step may refer to, or be performed by, a joining component as described with reference to FIG. 1.

At step 610, the system sets siblings of the matching fields of the secondary search result as siblings of the corresponding matching fields of the primary search result. In some cases, the operations of this step may refer to, or be performed by, a joining component as described with reference to FIG. 1.

At step 615, the system discards unmatched ancestor fields of the secondary search result. In some cases, the operations of this step may refer to, or be performed by, a joining component as described with reference to FIG. 1.

In a Primary Merge, the hierarchy of the primary is followed. Unmatched ancestor fields are discarded; matching fields are merged based on the merge rules; and matching field synonyms are displayed together (where possible). If matching field synonyms cannot be displayed together, a dashed line or another indication may be used to identify the connection. For example, if A is an ancestor of B in the primary result and B' is an ancestor of A' in the secondary (i.e., non-primary result), where A==A' and B==B' are synonyms, then A may remain an ancestor of B in the final, with A' being a descendent of B, and a dashed arrow from A' to A indicating their relationship.

The Primary Merge strategy can be extended to multiple hierarchical results as follows: the order of the merge is specified (i.e., where each result to be merged is given an index 1 . . . n); then, the merging order is set such that n is merged into (n−1) then the result into (n−2), and so on.

In the Primary Merge method, fields are identified with each other based on an equivalence class on the fields. In the example shown, the field "offeringId" is equivalent to the field "level30_id", and the array "offerings[ ]" is equivalent to the array "offering_hierarchics[ ]", (from the first database and second database, respectively).

Neighbors in an array of structures are structurally and semantically equivalent (have the same set of attributes), but are not related to each other. They are similar in their relationship to their ancestors. Siblings in a structure are structurally and semantically different, but are related to each other.

Thus, consider two hierarchies, J1 and J2 and given the following: A1 and A2 are arrays in J1 and J2, respectively; ea1 and ea2 are elements in A1 and A2; S1 and S2 are structures (i.e., objects) in J1 and J2, es1 and es2 are elements in S1 and S2. Then the following rules may be used to determine how the results are merged and displayed:

First, if ea1==ea2 and A1==A2, then ea2's siblings and ea1's siblings become siblings in the merger (as part of the same structure). Second, if S1==S2, then all the children of S1 and S2 become siblings in the merger.

An example of the first rule is provided in the example below based on the search results described above:

```
(
    "service": "Service Desk",
    "serviceL1": "Service Desk",
    "baselineName": "Service Desk Supported Users",
    "offerings(offering_hierarchies)": [{          -- A1(A2)
        "offeringId(id)": "ABCD-101",              -- ea1(ea2)
        "fin_div": "00",                           |
        "level30_desc": "(O) Workplace             |
        Support Services",                         |
        "level30_id": "ABCD-101",                  | siblings of ea2
        "level40_desc": "(O) for service desk",    |
        "level40_id": "LMNO-555",                  |
    }],
    "customer triggers":{
        "triggers":{
            {"trigger": "a) includes service desk agents;"};
            {"trigger": "b) Provides phone support for IT problems;"}
        },
        +
}
```

Third, if S1==A2 (J2 is primary), and es1==ea2, then siblings of es1 become attributes (and hence siblings) of ea2, but are populated only when the values in value(es1)=value (ea2). Where there are no matches, the attributes are present, but empty. Fourth, if S1==A2 (J1 is primary), the match is ignored.

An example of the third rule is provided below:

```
First Result:
"structmod" : {                      -- S1
    "l40_id" : "WXYZ-999",           -- es1
    "fin_div" : 99,
    "dept" : IT
}
Second Result
"modules" : [                        -- A2
    {
        "level40_id" : "WXYZ-888",
        "name" : "standard storage"
    },
    {
        "level40_id" : "WXYZ-999",   -- ea2
        "name" : "performance storage"
    },
]
Merged Result
"modules" : [
    {
        "level40_id" : "WXYZ-888",
        "name" : "standard storage"
    },
    {
        "level40_id(l40_id)" : "WXYZ-999",
        "name" : "performance storage",
        "fin_div" : 99,              |
        "dept" : IT                  | merged fields
    },
]
```

Note that rules 3 and 4 imply that that a structure (i.e., S1) can be equivalent to an array (i.e., A2) even though they correspond to different data types. That is, the rules may allow for a certain degree of flexibility in defining the equivalence classes.

Thus, in a first example of a Primary Merge (in which results from the first database are primary), the result of the join may be as follows:

```
[
    {
        "service": "Service Desk",
        "serviceL1": "Service Desk",
        "baselineName": "Service Desk Supported Users",
        "offerings(offering_hierarchies)": [{
            "offeringId(id)": "ABCD-101",
            "fin_div": "00",
            "level30_desc": "(O) Workplace Support Services",
            "level30_id": "ABCD-101",
            "level40_desc": "(O) for service desk",
            "level40_id": "LMNO-555",
        }]
    },
    {
        "offering_hierarchies": [{
            "fin_div": "00",
            "id": "ABCD-101",
            "level30_desc": "(O) Workplace Support Services",
            "level30_id": "ABCD-101",
            "level40_desc": "(O) for service desk",
            "level40_id": "LMNO-555",
        }],
        "service": "Service Desk",
        "serviceL1": "Service Desk",
        "baselineName": "Percent Non-English calls",
        "offerings(offering_hierarchies)": [{
            "offeringId(id)": "ABCD-101",
            "optimizable": true,
            "costBaselines": {
                "US": {
                    "process": "SO:US:Mobility Service Service Desk",
                }
            },
            "fin_div": "00",
            "level30_desc": "(O) Workplace Support Services",
            "level30_id": "ABCD-101",
            "level40_desc": "(O) for service desk",
            "level40_id": "LMNO-555",
        }]
    }
]
```

In a second example of a Primary Merge, results from the second database are primary and the results follow the format of the second database:

```
[
    {
        "offering_hierarchies(offerings)": [{
            "fin_div": "00",
            "id(offeringId)": "ABCD-101",
            "level30_desc": "(O) Workplace Support Services",
            "level30_id": "ABCD-101",
            "level40_desc": "(O) for service desk",
            "level40_id": "LMNO-555",
        }],
        "customer_triggers": {
            "triggers": [
                {"trigger": "a) Includes service desk agents;"},
                {"trigger": "b) Provides phone support for IT
                    problems;"}
            ],
        },
    },
    {
        "offering_hierarchies(offerings)": [{
            "fin_div": "00",
            "id(offeringId)": "ABCD-101",
            "level30_desc": "(O) Workplace Support Services",
            "level30_id": "ABCD-101",
            "level40_desc": "(O) for service desk",
            "level40_id": "LMNO-555",
            "optimizable": true,
            "costBaselines": {
                "US": {"process": "SO:US:Mobility Service
                    Service Desk",}
            }
        }],
        "customer_triggers": {
            "triggers": [
                {"trigger": "a) Includes service desk agents;"},
                {"trigger": "b) Provides phone support for IT
                    problems;"}
            ],
        },
    }
]
```

Accordingly, the present disclosure includes the following embodiments.

A method for performing joins on data from hierarchical databases is described. The method may include receiving one or more search results from each of a plurality of hierarchical databases, identifying one or more matching fields from each of the search results, joining the search results according to a set of rules for processing related fields to the matching fields, wherein the related fields comprise sibling fields, neighbor fields, ancestor fields, descendant fields, or any combination thereof, and generating one or more combined search results based on the joining.

An apparatus for performing joins on data from hierarchical databases is described. The apparatus may include a processor, memory in electronic communication with the processor, and instructions stored in the memory. The instructions may be operable to cause the processor to receive one or more search results from each of a plurality of hierarchical databases, identify one or more matching fields from each of the search results, join the search results according to a set of rules for processing related fields to the matching fields, wherein the related fields comprise sibling fields, neighbor fields, ancestor fields, descendant fields, or any combination thereof, and generate one or more combined search results based on the joining.

A non-transitory computer readable medium storing code for performing joins on data from hierarchical databases is described. In some examples, the code comprises instructions executable by a processor to: receive one or more search results from each of a plurality of hierarchical databases, identify one or more matching fields from each of the search results, join the search results according to a set of rules for processing related fields to the matching fields, wherein the related fields comprise sibling fields, neighbor fields, ancestor fields, descendant fields, or any combination thereof, and generate one or more combined search results based on the joining.

Some examples of the method, apparatus, and non-transitory computer readable medium described above may further include identifying a query for each of the hierarchical databases. Some examples may further include transmitting the corresponding query to each of the hierarchical databases, wherein the search results from each of the hierarchical databases are received in response to the query. In some examples, the query for each of the hierarchical databases comprises a same query.

Some examples of the method, apparatus, and non-transitory computer readable medium described above may further include identifying a field name synonym list comprising one or more field name equivalence classes. Some examples may further include determining that a field name of the one or more matching fields from each of the search results comprises an equivalent field name based on the field name synonym list.

Some examples of the method, apparatus, and non-transitory computer readable medium described above may further include generating the field name synonym list based on at least one of the hierarchical databases using a machine learning model. In some examples, the one or more fields from each of the search results comprises a common value.

Some examples of the method, apparatus, and non-transitory computer readable medium described above may further include identifying one or more top level fields from each of the search results. Some examples may further include setting the top level fields as sibling fields.

Some examples of the method, apparatus, and non-transitory computer readable medium described above may further include selecting a primary search result and a secondary search result from the search results. Some examples may further include merging matching fields of the primary search result and the secondary search result. Some examples may further include setting siblings of the matching fields of the secondary search result as siblings of the corresponding matching fields of the primary search result. Some examples may further include discarding unmatched ancestor fields of the secondary search result.

Some examples of the method, apparatus, and non-transitory computer readable medium described above may further include selecting a subsequent search result from the search result. Some examples may further include joining the subsequent search result into a combined search result of all previously merged search results according to the set of rules for processing related fields until each of the search results has been joined.

Some examples of the method, apparatus, and non-transitory computer readable medium described above may further include displaying the combined search results to a user in response to a query, in some examples, the combined search results are displayed using different colors for data coming from different hierarchical databases.

Some examples of the method, apparatus, and non-transitory computer readable medium described above may further include displaying a plurality of field names for each of the matching fields together as a combined field name. In some examples, the combined search results comprise a plurality of distinct combined search results corresponding to a plurality of distinct search results from at least one of the hierarchical databases combined with one or more other search results from another of the hierarchical databases.

In some examples, the set of rules for processing related fields specifies that if two arrays each have a matching element then sibling fields of the matching elements become sibling fields of each other. In some examples, the set of rules for processing related fields specifies that children fields of matching elements become sibling fields of each other. In some examples, the set of rules for processing related fields specifies that if a primary search result comprises an array having an element with a first field, and a secondary search result comprises a non-array object with a second a field matching the first field, then sibling fields of the second field become siblings of the first field. In some examples, the set of rules for processing related fields specifies that if a primary search result comprises a non-array object with a first field, and a secondary search result comprises an array having an element with a second field matching the first field, the second field matching the first field is discarded.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

In this disclosure and the following claims, the word "or" indicates an inclusive list such that, for example, the list of X, Y, or Z means X or Y or Z or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on."

What is claimed is:

1. A method for performing data joins, comprising:
   identifying a query for each of a plurality of hierarchical databases including a first database and a second database;
   transmitting the corresponding query to each of the hierarchical databases;
   receiving search results including a first search result from the first database and a second search result from a second database in response to the corresponding query to each of the hierarchical databases, wherein the first result is an array with a first field, and the second search result is a non-array object with a second field matching the first field;
   identifying one or more matching fields from each of the search results;
   joining the search results according to a set of rules for processing fields related to the matching fields, wherein the fields related to the matching fields comprise sibling fields of the matching fields, neighbor fields of the matching fields, ancestor fields of the matching fields, descendant fields of the matching fields, or any combination thereof, and wherein joining the search results comprises making sibling fields of the second field of the non-array object become siblings of the first field of the array;
   generating one or more combined search results based on the joining; and
   displaying the combined search results to a user in response to a query.

2. The method of claim 1, wherein:
   the query for each of the hierarchical databases comprises a same query.

3. The method of claim 1, further comprising:
   identifying a field name synonym list comprising one or more field name equivalence classes; and
   determining that a field name of the one or more matching fields from each of the search results comprises an equivalent field name based on the field name synonym list.

4. The method of claim 3, further comprising:
   generating the field name synonym list based on at least one of the hierarchical databases using a machine learning model.

5. The method of claim 1, wherein:
   the one or more fields from each of the search results comprises a common value.

6. The method of claim 1, further comprising:
identifying one or more top level fields from each of the search results; and
setting the top level fields as sibling fields.

7. The method of claim 1, further comprising:
selecting the primary search result and the secondary search result from the search results;
merging matching fields of the primary search result and the secondary search result;
setting siblings of the matching fields of the secondary search result as siblings of the corresponding matching fields of the primary search result; and
discarding unmatched ancestor fields of the secondary search result.

8. The method of claim 7, further comprising:
selecting a subsequent search result from the search results; and
joining the subsequent search result into a combined search result of all previously merged search results according to the set of rules for processing fields related to the matching fields until each of the search results has been joined.

9. The method of claim 1, wherein:
the combined search results are displayed using different colors for data coming from different hierarchical databases.

10. The method of claim 1, further comprising:
displaying a plurality of field names for each of the matching fields together as a combined field name.

11. The method of claim 1, wherein:
the combined search results comprise a plurality of distinct combined search results corresponding to a plurality of distinct search results from at least one of the hierarchical databases combined with one or more other search results from another of the hierarchical databases.

12. The method of claim 1, wherein:
the set of rules for processing fields related to the matching fields specifies that if two arrays each have a matching element then sibling fields of the matching elements become sibling fields of each other.

13. An apparatus for performing joins on data from hierarchical databases, comprising: a processor and a memory storing instructions and in electronic communication with the processor, the processor being configured to execute the instructions to:
identify a query for each of a plurality of hierarchical databases including a first database and a second database;
transmit the corresponding query to each of the hierarchical databases;
receive search results including a first search result from the first database and a second search result from a second database in response to the corresponding query to each of the hierarchical databases, wherein the first result is an array with a first field, and the second search result is a non-array object with a second field matching the first field;
identify one or more matching fields from each of the search results;
join the search results according to a set of rules for processing fields related to the matching fields, wherein the fields related to the matching fields comprise sibling fields of the matching fields, neighbor fields of the matching fields, ancestor fields of the matching fields, descendant fields of the matching fields, or any combination thereof, and wherein joining the search results comprises making sibling fields of the second field of the non-array object become siblings of the first field of the array;
generate one or more combined search results based on the joining; and
display the combined search results to a user in response to a query.

14. A non-transitory computer readable medium storing code for performing joins on data from hierarchical databases, the code comprising instructions executable by a processor to:
identify a query for each of a plurality of hierarchical databases including a first database and a second database;
transmit the corresponding query to each of the hierarchical databases;
receive search results including a first search result from the first database and a second search result from a second database in response to the corresponding query to each of the hierarchical databases, wherein the first result is an array with a first field, and the second search result is a non-array object with a second field matching the first field;
identify one or more matching fields from each of the search results;
join the search results according to a set of rules for processing fields related to the matching fields, wherein the fields related to the matching fields comprise sibling fields of the matching fields, neighbor fields of the matching fields, ancestor fields of the matching fields, descendant fields of the matching fields, or any combination thereof, and wherein joining the search results comprises making sibling fields of the second field of the non-array object become siblings of the first field of the array;
generate one or more combined search results based on the joining; and
display the combined search results to a user in response to a query, wherein the combined search results are displayed using different colors for data coming from different hierarchical databases.

15. The non-transitory computer readable medium of claim 14, the code further comprising instructions executable by the processor to:
select a primary search result and a secondary search result from the search results;
merge matching fields of the primary search result and the secondary search result;
set siblings of the matching fields of the secondary search result as siblings of the corresponding matching fields of the primary search result; and
discard unmatched ancestor fields of the secondary search result.

* * * * *